United States Patent [19]

Arakawa

[11] Patent Number: 5,252,799
[45] Date of Patent: Oct. 12, 1993

[54] WIRE CUT ELECTRIC DISCHARGE MACHINE

[75] Inventor: Yasuo Arakawa, Oshino, Japan

[73] Assignee: Fanuc Ltd, Minamitsuru, Japan

[21] Appl. No.: 920,478

[22] PCT Filed: Dec. 21, 1991

[86] PCT No.: PCT/JP91/01749
§ 371 Date: Aug. 24, 1992
§ 102(e) Date: Aug. 24, 1992

[87] PCT Pub. No.: WO92/11969
PCT Pub. Date: Jul. 23, 1992

[30] Foreign Application Priority Data

Dec. 26, 1990 [JP] Japan .................. 2-413878

[51] Int. Cl.[5] ............................. B23H 7/10
[52] U.S. Cl. ............... 219/69.12; 226/190; 242/157 R
[58] Field of Search .......... 219/69.12; 242/157 R; 254/403, 411; 226/190, 193, 194

[56] References Cited

U.S. PATENT DOCUMENTS

| | | | |
|---|---|---|---|
| 1,185,179 | 5/1916 | Chattaway | 254/411 |
| 4,383,161 | 5/1983 | Corcelle | 219/69.12 |
| 4,414,458 | 11/1983 | Nomura | 219/69.12 |
| 4,445,355 | 5/1984 | Budzich et al. | 242/157 R |
| 4,733,038 | 3/1988 | Girardin | 219/69.12 |
| 4,842,251 | 6/1989 | Porter | 242/157 R |
| 5,178,313 | 1/1993 | LeCompte et al. | 226/190 |

FOREIGN PATENT DOCUMENTS

| | | |
|---|---|---|
| 59-14115 | 4/1984 | Japan . |
| 59-128325 | 8/1984 | Japan . |
| 62-236628 | 10/1987 | Japan .................. 219/69.12 |

Primary Examiner—Geoffrey S. Evans
Attorney, Agent, or Firm—Staas & Halsey

[57] ABSTRACT

A wire cut electric discharge machine (1) having an improved wire guide means (17) located at a bent portion of a wire path. The wire guide means (17) comprises a wire guide roller (6) and a wire deviation preventive member (16) whose one end is fixed to the side of body (3). A part of a retaining member (22) provided in the wire deviation preventive member (16) is fitted into a wire fitting groove (20), and a retaining groove (27) is formed on a face of the retaining member (22) located opposite to the bottom of the wire fitting groove (20). Further, the retaining member (22) is disposed to define, between itself and a wall (26) of the wire fitting groove (20), a clearance having a dimension slightly larger than a wire diameter. When a wire 2 is suddenly broken during an electric discharge machining for some reason, even if the wire bounces at a portion applied round the wire guide roller (6) while moving backward along the wire path, the inertia to cause the wire (2) to bounce and move backward can be absorbed by the retaining groove 27, thereby preventing the wire from being deviated from the wire guide roller (6). When newly applying the wire (2) around the wire guide roller (6), the wire can be applied easily through a clearance between the retaining member (22) in the wire deviation preventive member (16) and a groove wall (26) of the wire guide roller (6).

3 Claims, 6 Drawing Sheets

WIRE CUT ELECTRIC DISCHARGE MACHINE

DESCRIPTION

Technical Field

The present invention relates to a wire cut electric discharge machine having an improved support structure for supporting a wire which functions as an electrode.

Background Art

As shown in FIG. 5, in the conventional wire electric discharge machine 1, an unused wire 2 is usually wound around a supply reel 4 which is rotatably attached to a machine body 3, in order to be ready for a machine operation. The wire 2 is fed along a path starting at the wire supply reel 4, as a start point, and ending at a wire recovery box 12, as an end point, through a brake roller 5, upper wire guide roller 6, upper guide 7, lower guide 8, lower guide roller 9, guide roller 10 and feed roller 11, which are disposed in the order named. Used wire 2 is recovered in the wire recovery box 12.

The brake roller 5 is one of wire braking means displaying a braking ability in cooperation with a pinch roller 13, while a feed roller 11 is one of wire traction means displaying a tractive ability in cooperation with a pinch roller 14. Reference numeral 15 denotes a workpiece which is arranged at a machining position in FIG. 5. Furthermore, the wire 2 serves as electrodes and functions as one of the electrodes in an electric discharge machining.

During the machining of the workpiece 15, the wire 2 is drawn out of the wire supply reel 4 by means of a tractive force generated by the feed roller 11, to be moved along the wire path. On the half way of the path, resistance is given to the movement of the wire 2 by means of the brake roller 5, or the wire 2 is braked. Whereby a tensile force (wire tension) is applied to the wire 2 on the downstream side (the feed roller 11 side) with respect to the brake roller 5. The tension is required to maintain a normal discharge state during the electric discharge machining.

Therefore, during the wire cut discharge machining, when the wire 2 is suddenly broken anywhere in its downstream side portion by any reasons (e.g. damage on the surface of the wire, contact with the workpiece, fusion caused by irregular supply of machining fluid, or the like), the wire portion on the upstream side of the broken point (on the side of brake roller 5) bounces upwardly due to reaction of the tension applied so far. On the other hand, the portion of wire on the downstream side of the broken point is drawn out by means of the feed roller 11 to be received by the wire recovery box 12.

In this case, when the portion of wire on the upstream side of the broken point bounces hard, the wire 2 waves as shown by one dotted chain line in FIG. 6, hangs down as shown by a dotted line and will come off the wire guide roller 6 which is situated right above the upper guide 7. As a result, it will become difficult for an operator to make a wire feeding work for restoring normal state for the wire after its break, or it will be impossible to make an automatic wire feeding by actuating an automatic wire feeding device (AWF) even if the wire cut electric discharge machine 1 is provided with such a device.

Thus, in order to prevent the problem mentioned above, conventionally, as shown in a side view of FIG. 7, the wire guide means 17, which is a combination of a wire deviation preventive member 16 and the wire guide roller 6, is used. The wire deviation preventive member 16 comprises a spring plate 18 fixed on the side of a body 3 of the wire cut electric discharge machine 1 and a pad 19 attached to a free end of the spring plate. The pad 19 is arranged to face the wire guide roller 6 with a slight clearance therebetween. The position of the pad is in a range where the wire 2 is applied around a wire groove 20. Thus, when the wire break occurs, the wire 2 bounces to come into contact with the pad 19, whereby the wire 2 will be prevented from bouncing further and also from deviating from the wire guide roller 6. Incidentally, the wire groove 20 of the wire guide roller 6 is formed into a V-shape in cross section and is usually about 5 mm deep.

However, according to the conventional wire guide means 17, a distance t between the bottom of the wire groove 20 and a lower face of the pad 19 is considerably large, so that the bounced wire 2 slips backwardly through a clearance between the bottom and the pad 19, due to reaction of tension, before the wire comes into contact with the pad 19, thereby causing a drawback such that the wire deviates from the wire guide roller 6. This defect tends to become more conspicuous as the wire groove 20 is formed deeper to prevent the deviation of wire from the wire guide roller 6, since this causes the distance t to increase further.

Moreover, every time the wire 2 is to be applied around the wire groove 20 of the wire guide roller 6, the operator is required to do a troublesome work such as lifting the pad 19, since the pad 19 is located as close as possible to the circumferential face of the wire guide roller 6 in order to prevent the bounced wire 2 from slipping through the clearance between the pad 19 and the circumferential face of the wire guide roller 6.

DISCLOSURE OF THE INVENTION

It is, therefore, an object of this invention to provide a wire cut electric discharge machine which has wire traction means disposed on one side of a path of a wire electrodes with respect to a workpiece and wire brake means disposed on another side of the wire path, and a wire guide roller disposed at a bent portion of the wire path, located between the workpiece and the wire brake means, comprises a wire guide means including the wire guide roller, and is capable of suppressing the bouncing of the wire by means of the wire guide means when the wire functioning as an electrode is suddenly broken for some reasons during a wire cut electric discharge machining, thereby preventing the wire from deviating from the wire guide roller.

To achieve this object, according to the present invention, the wire guide means has an improved structure in a wire cut electric discharge machine, which includes wire traction means disposed on one side of a path of a wire to function as an electrode with respect to a workpiece, a wire brake means disposed on another side of the wire path and wire guide means located at a bent portion, between the workpiece and the wire brake means, of the wire path.

The wire guide means according to the present invention comprises a wire guide roller, rotatably attached to a body of the wire cut electric discharge machine, and a wire deviation preventive member whose one end side is fixed to the body.

The wire guide roller has a wire fitting groove on its circumferential face, while the wire deviation preventive member includes a retaining or suppression member on the side of another end located opposite to the side of said one end.

The retaining member extends along the wire fitting groove over an angular range, where the wire is applied around the groove, and has a retaining groove at a face located opposite to a bottom of the upwardly opening wire fitting groove. Further, the retaining groove is formed through the retaining member all the way from a starting end to a terminal end of the member along the wire fitting groove, and has an inner surface of the retaining groove made of a material having a high coefficient of friction to the wire.

The wire deviation preventive member is disposed in such a manner that a clearance is defined between the retaining member and a wall of the wire fitting groove of the wire guide roller, the clearance having a dimension slightly larger than a diameter of the wire.

Thus, according to the present invention, even if the wire is suddenly broken for some reasons during the wire electric discharge machining to bounce from the wire guide roller, the wire deviation preventive member can prevent the wire from deviating from the wire guide roller. On the other hand, when newly applying the wire around the wire guide roller, the wire can be applied around the wire guide roller easily through the clearance between the retaining member in the wire deviation preventive member and the groove wall in the wire guide roller.

BEST MODE OF CARRYING OUT THE INVENTION

Figure 1:
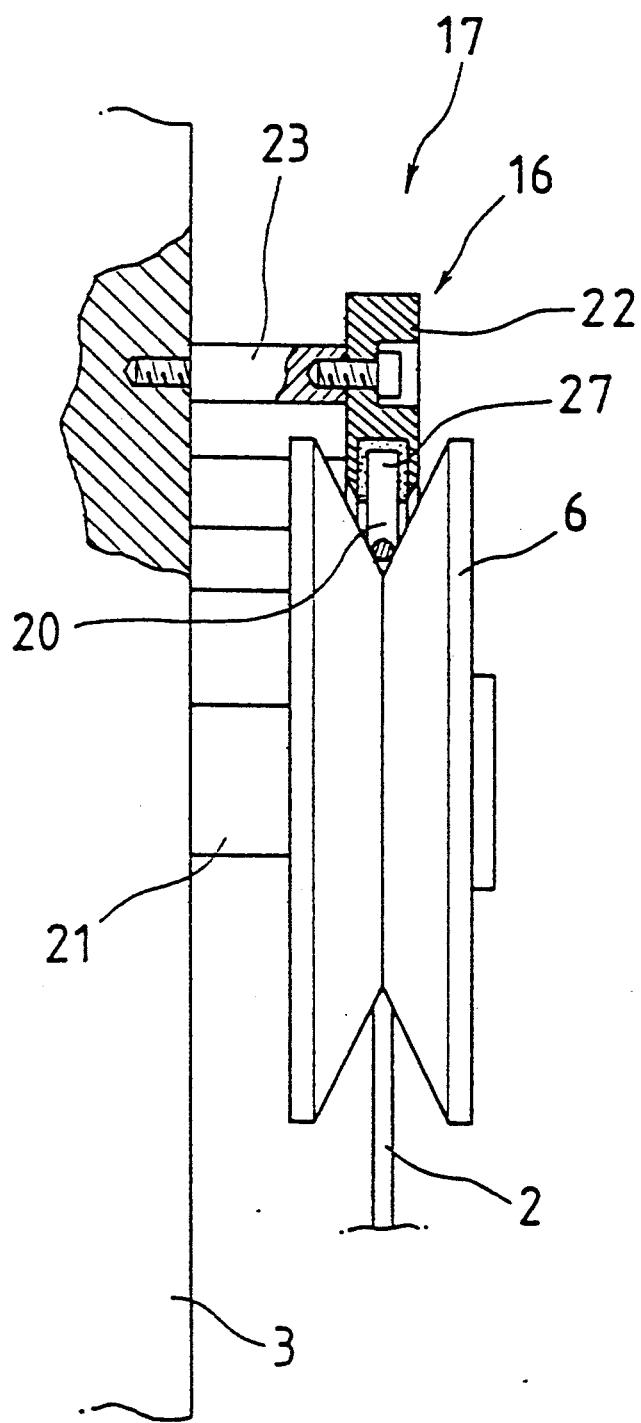
FIG. 1 is a side view, partly shown as cross-sectional view, illustrating wire guide means according to the present invention.

FIG. 1 shows a part of wire guide means 17 in a wire cut electric discharge machine 1. The wire cut electric discharge machine 1, shown as an embodiment, is substantially the same in structure as the aforesaid conventional one except that it has an improved wire guide means 17. Explanations relating to the structure common to both the machines will be omitted, if not necessary.

Figure 5:
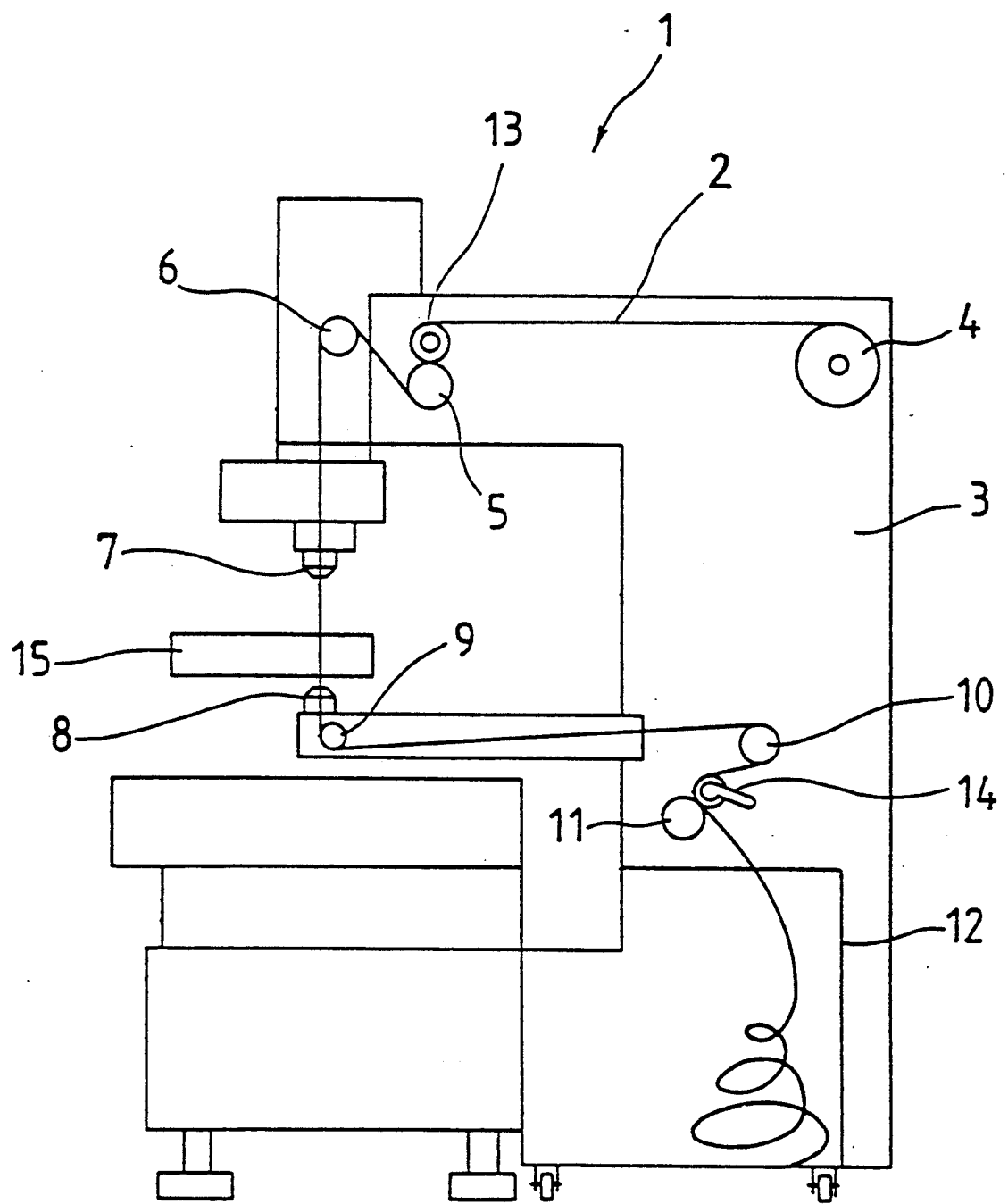
FIG. 5 is a front view of a wire cut electric discharge machine, mainly showing a wire path.
Figure 6:
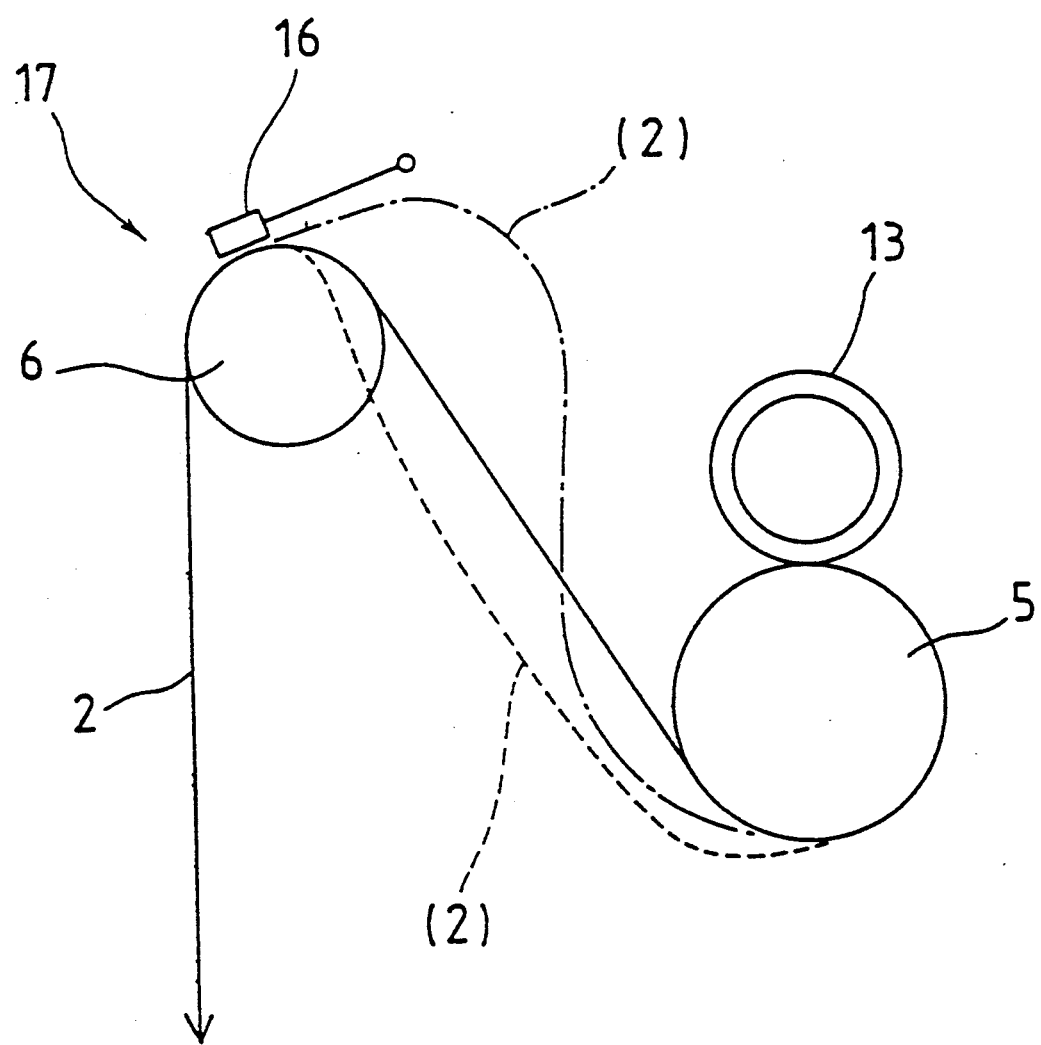
FIG. 6 is a front view showing a state in which the wire bounces to deviate from the wire guide roller.
Figure 7:
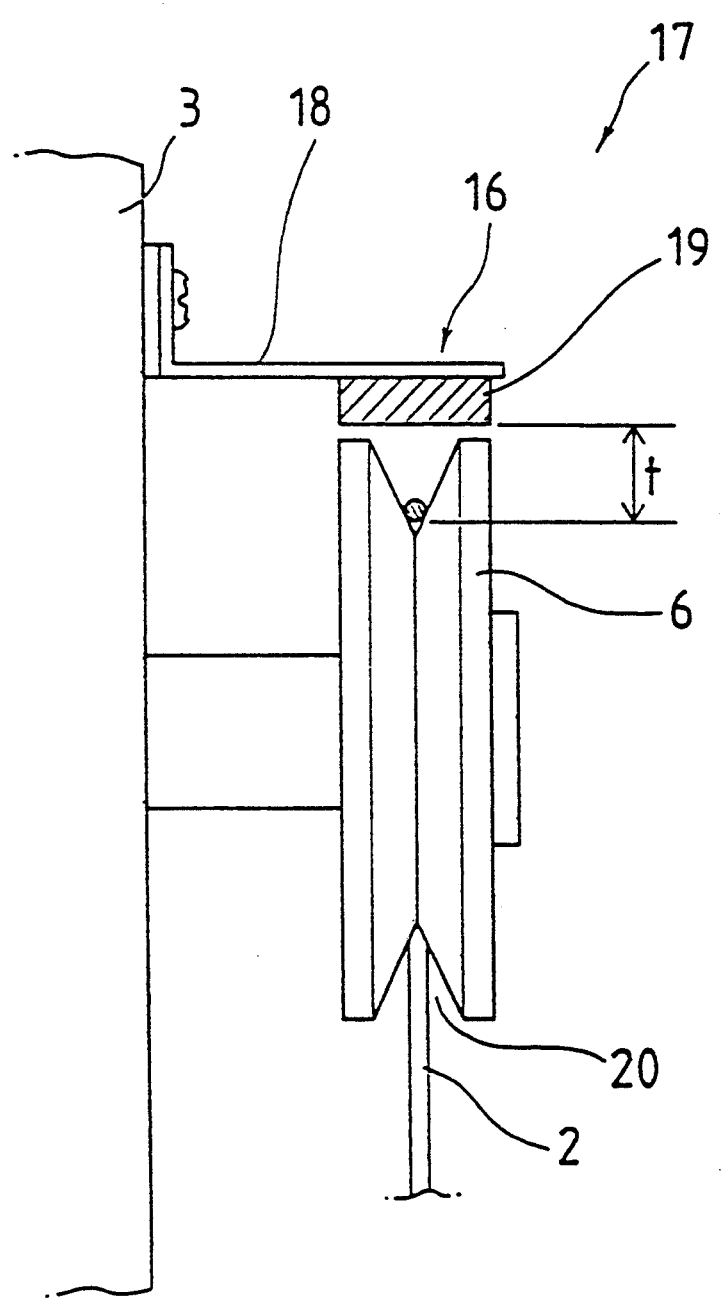
FIG. 7 is a side view of a conventional wire deviation preventive means.

The wire guide means 17 comprises a wire guide roller 6 and a wire deviation preventive member 16. As in the conventional machine shown in FIG. 5, the wire guide roller is situated above an upper guide 7 and between the upper guide 7 and a brake roller 5 or between a workpiece 15 and a wire braking means to bend the direction of a wire path, which path extends from the brake roller 5, toward the upper guide 7.

The wire guide roller 6 is rotatably mounted to a body 3 of the wire cut electric discharge machine 1 by means of a shaft 21 and is formed at its circumferential edge with a wire fitting groove 20 with V-shape cross section.

The wire deviation preventive member 16 includes a retaining member 22 and three stays 23.

Figure 2:
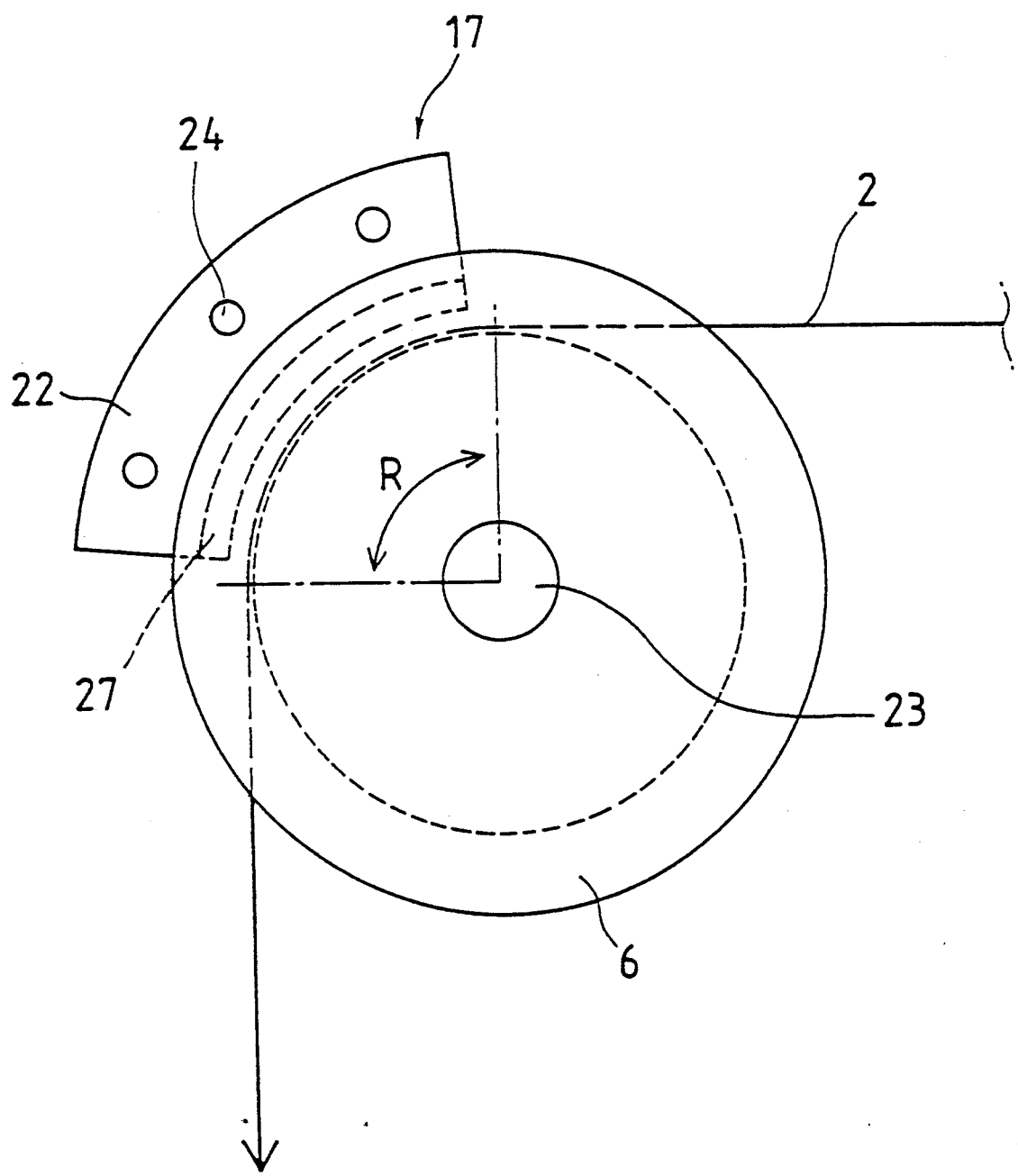
FIG. 2 is a front view of the wire guide means.

The retaining member 22 is made of a plastic or the like, and is, as a whole, formed into an arcuate shape as shown in FIG. 2. One ends of the stays 23 are screwed into the body 3 to be fixed thereto respectively. The retaining member 22 is attached to the other ends of the stays 23 by means of bolts 24. More particularly, the wire deviation preventive member 16 has one side thereof fixed to the body 3, and the other or opposite side thereof provided with the retaining member 22.

Further, the retaining member 22 extends along a wire fitting groove 20 over an angular range R where the wire is applied around the groove. As shown in cross section in FIG. 3, the circumferential end portion of the member 22 on the side of wire guide roller 6 is formed into a wedge-shape having its width gradually decreasing towards the wire guide roller 6 and a plane face at its distal end. Whereby a portion of the retaining member 22 situated on the side of the wire guide roller 6 can be fitted into the wire fitting groove 20 of the roller, and inclined opposite faces 25 of the member 22 can be arranged in parallel to groove walls 26 of the wire fitting groove 20.

Moreover, the retaining member 22 includes a retaining groove 27 defined on a face opposite to a bottom of the wire fitting groove 20. The retaining groove 27 is open toward the bottom of the wire fitting groove 20 and is formed through the retaining member 22 from its starting end to its terminal end along the wire fitting groove 20. In the present embodiment, the retaining groove 27 is a squarish U-shaped in traverse cross section. A groove rubber 28 having a squarish U-shaped transverse cross section is fitted to an inner surface of the retaining groove 27. The rubber constituting the groove rubber 28 is one of materials having a high coefficient of friction between itself and a surface of the wire 2.

The wire deviation preventive member 16 constructed as mentioned above is arranged relative to the wire guide roller 6 so that a clearance whose dimension (0.4 to 0.5 mm) is slightly greater than a diameter of the wire is defined between the retaining member 22 and the wall 26 of the wire fitting groove 20.

Figure 3:
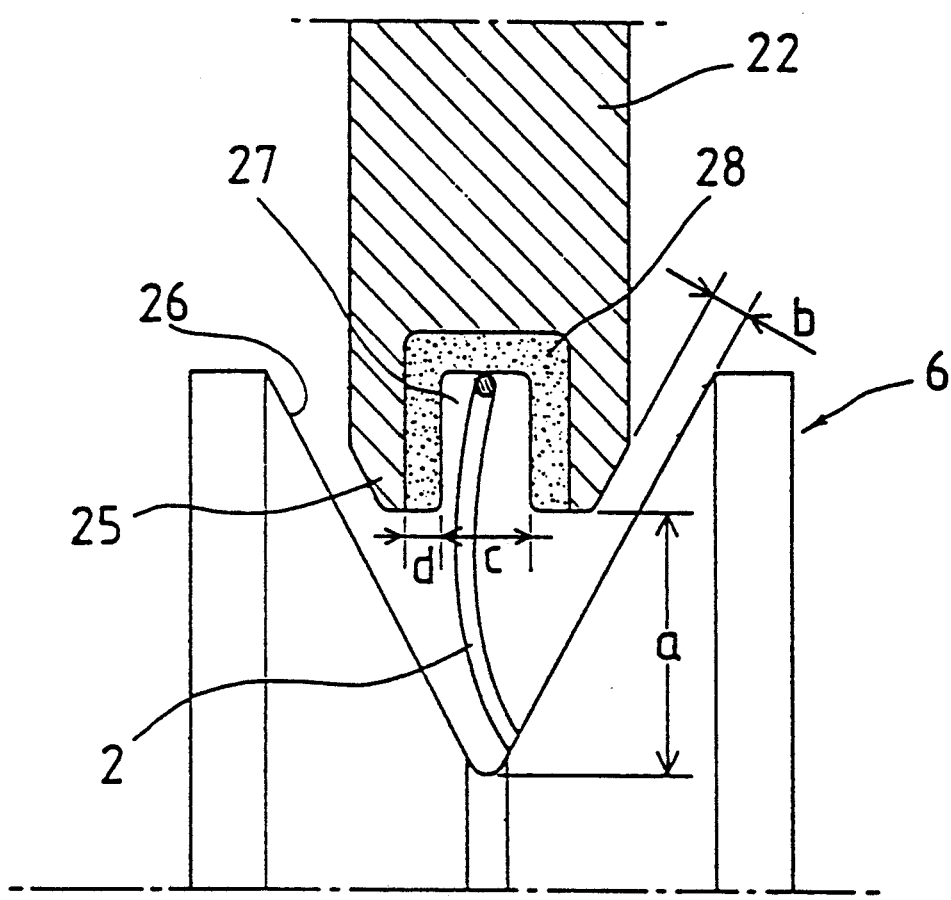
FIG. 3 is a fragmentary enlarged side view, partly shown as cross-sectional view, showing the wire guide means.

For example, in FIG. 3,
- a distance a between the bottom of the wire fitting groove 20 and the opposite face of the retaining member 22 is 5 mm;
- a distance b between the inclined face 25 of the retaining member 22 and the wall 26 of the wire fitting groove 6 is 0.4 mm;
- a width c of opening portion in the retaining groove 27 is 4 mm;
- a thickness d of the groove rubber is 1 mm;

The wire cut electric discharge machine 1 of the present invention having the above structure operates in the following manner to perform electric discharge machining to the workpiece 15. Incidentally, let it be assumed that the wire 2 is extended (arranged) along the wire path extending from the wire supply reel 4 to the feed roller 11, and the electric discharge machining normally progresses. Operations similar to the conventional ones will be briefly explained.

The wire 2 is drawn by means of the feed roller 11 to be drawn out of the wire supply reel 4. Then, the wire 2 is braked by the brake roller 5 which is located on the halfway of the wire path so that a tensile force necessary for the maintenance of the electric discharge machining is applied to the wire. Further, the wire 2 is looped around the wire guide roller 6, situated above the upper guide 7, over a range of an angle R, as shown in FIG. 3. That is, the wire is moved as it is in contact with the groove bottom of the wire guide roller 6, and, by means of the roller 6, the direction of the wire path is bent from the brake roller 5 toward the upper guide 7.

In addition, the wire deviation preventive member 16 is not in contact with the wire guide roller 6, so that it will not give any influence on a rotation of the roller 6. Thus, the member 16 can be free of an adverse effect, such as a change of the wire tension due to any extra force acting on the wire guide roller 6, throughout the wire cut electric discharge machining.

Under such condition, if the wire 2 is suddenly broken at a discharging point to the workpiece 15, for instance, the portion of the wire on the side of the brake roller 5 with respect to the break point bounces due to reaction of its tension. However, that portion of the wire is made to fit into the retaining groove 27 of the wire deviation preventive member 16. At first, therefore, that portion of the wire collides with the groove rubber 28 attached in the retaining groove 27, thereby causing the bouncing inertia of the broken wire to be absorbed. Then, as a second state, that portion of wire will be brought into contact with the groove rubber 28, so that energy to cause that portion of wire to be drawn backward will be absorbed by a frictional force generated between the wire portion and the groove rubber. As a consequence, the wire portion on the side of brake roller 5 with respect to the workpiece 15 is promptly restored to a stationary state without bouncing hard, so that the wire portion is prevented from being deviated from the wire fitting groove 20.

Furthermore, when newly applying the wire 2 which is drawn out of the wire supply reel 4, around the wire guide roller 6 for, e.g., exchange of the wire, the wire can be applied easily to the reel with one hand by lightly pushing the wire 2 into a clearance between the wire deviation preventive member 16 and the wall 26 of the wire fitting groove 20 so that the wire is placed at the bottom of the wire fitting groove 20.

Figure 4A:
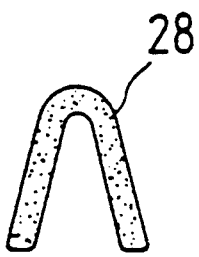
FIGS. 4(A) and 4(B) are sectional views showing other embodiments of a groove rubber.
Figure 4B:
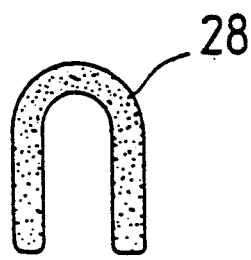

The above description is concerned with an embodiment of the present invention. The groove rubber 28 may be formed to have a V-shaped or U-shaped cross section as shown in FIGS. 4(A) and 4(B). The entirety of retaining member 22 may be made of a material producing high friction such as a rubber.

With the construction as is mentioned above, in the case of the wire cut electric discharge machine 1 according to the present invention, even if the wire is suddenly broken during the electric discharge machining and is brought into a inoperable state, the wire guide means 17 can almost prevent the wire 2 from bouncing so hard as to cause the wire to be deviated from the wire guide roller 6. Thus, the time required for the repair work for the wire 2 can be reduced substantially.

Moreover, even though the wire is suddenly broken during the electric discharge machining due to any of possible reasons, the wire will not deviate from the wire guide roller 6. Thus, it is always possible to automatically repair the wire break state by means of an automatic wire feeding device, thereby enabling an automatic operation of the wire cut electric discharge machine continuously over a long period of time.

In addition, when applying the wire around the wire guide roller, the wire deviation preventive member need not be operated, thereby making easier the operation of the wire cut electric discharge machine.

I claim:

1. A wire cut electric discharge machine, having a wire traction means disposed on one side of a path of a wire which functions as electrodes with respect to a workpiece, a wire brake means disposed on another side of the wire path and a wire guide means disposed at a bent portion, located between the workpiece and the wire brake means, of the wire path, and characterized in that:

said wire guide means comprises a wire guide roller which is rotatably attached to a body of the wire cut electric discharge machine and a wire deviation preventive member whose one end is fixed to the body;

said wire guide roller has a wire fitting groove on its circumferential face, while said wire deviation preventive member including a retaining member disposed at its another end opposite to said one end;

said retaining member extends along the wire fitting groove over an angular range where the wire is applied around the groove, said retaining member having an upwardly opening retaining groove in a face opposite to a bottom of the wire fitting groove;

said retaining groove is formed all the way through said retaining member from a starting end to a terminal end of the member along the wire fitting groove, said retaining groove having an inner surface made of a material having a high coefficient of friction to the wire; and said wire deviation preventive member is arranged in such a manner that a clearance is defined between said retaining member and a wall of the wire guide roller, the clearance having a dimension slightly greater than a diameter of the wire.

2. A wire cut electric discharge machine according to claim 1, wherein said machine includes an upper guide arranged close to an upper face of the workpiece, said wire guide means is situated above the upper guide, and the wire path is bent to the direction from the brake means toward the upper guide.

3. A wire cut electric discharge machine according to claim 1, wherein said wire traction means is a feed roller cooperating with a pinch roller, and said wire brake means is a brake roller cooperating with a pinch roller.

* * * * *